(12) United States Patent
Roger

(10) Patent No.: US 10,974,334 B2
(45) Date of Patent: Apr. 13, 2021

(54) SOLDERING TOOL WITH NOZZLE-SHAPED SOLDERING TIP AND A CHANNEL IN THE SOLDERING TIP TO FEED HOT GAS

(71) Applicant: FEW Fahrzeugelektrikwerk GmbH & Co. KG, Zwenkau (DE)

(72) Inventor: David Roger, Leipzig (DE)

(73) Assignee: FEW Fahrzeugelektrikwerk GmbH & Co. KG, Zwenkau (DE)

( * ) Notice: Subject to any disclaimer, the term of this patent is extended or adjusted under 35 U.S.C. 154(b) by 49 days.

(21) Appl. No.: 16/362,923

(22) Filed: Mar. 25, 2019

(65) Prior Publication Data
US 2019/0321903 A1   Oct. 24, 2019

(30) Foreign Application Priority Data
Apr. 18, 2018  (DE) .................. 10 2018 109 229.6

(51) Int. Cl.
*B23K 3/00*   (2006.01)
*B23K 3/02*   (2006.01)
*B23K 1/012*  (2006.01)

(52) U.S. Cl.
CPC .............. *B23K 3/025* (2013.01); *B23K 1/012* (2013.01)

(58) Field of Classification Search
CPC ...... B23K 3/025; B23K 1/012; B23K 3/0338; B23K 3/00–087; B23K 1/0016; C03C 27/04
USPC .................. 228/6.2, 42, 51–55, 218–220
See application file for complete search history.

(56) References Cited

U.S. PATENT DOCUMENTS

| | | | | |
|---|---|---|---|---|
| 1,862,653 A | * | 6/1932 | Bean | B23K 3/0307 219/234 |
| 2,550,090 A | * | 4/1951 | Schnepp | B23K 3/0307 219/234 |
| 2,947,274 A | * | 8/1960 | Wobbe | B23K 3/082 228/30 |
| 3,529,760 A | * | 9/1970 | Hickman | H05K 13/0491 228/51 |
| 3,746,239 A | * | 7/1973 | Auray | H05K 13/0491 228/19 |

(Continued)

FOREIGN PATENT DOCUMENTS

| | | | | |
|---|---|---|---|---|
| DE | 24 40 005 A1 | | 2/1975 | |
| EP | 1849548 A1 | * | 10/2007 | ............ B23K 1/012 |

(Continued)

*Primary Examiner* — Kiley S Stoner
(74) *Attorney, Agent, or Firm* — Bodner & O'Rourke, LLP; Gerald T. Bodner; Christian P. Bodner

(57) ABSTRACT

A soldering tool, comprising nozzle shaped soldering tip and a hot gas feed channel that runs in the soldering tip, wherein the hot gas feed channel includes openings that provide a hot gas exhaust, and wherein the soldering tip as well as a portion of a soldering environment is heatable by the hot gas, characterized in that the soldering tip includes one or plural contact surfaces that have a surface structure which corresponds to a surface structure of a soldering object so that the soldering object is thermally contactable by the soldering tip with a minimum heat resistance, wherein a hot gas jet that passes through the openings is forced to perform at least one directional reversal or directional deflection by placement of the soldering tip and contacting the soldering object.

9 Claims, 3 Drawing Sheets

(56) References Cited

U.S. PATENT DOCUMENTS

| | | | | |
|---|---|---|---|---|
| 4,626,205 A * | 12/1986 | Barkley | ............ | H05K 13/0486 |
| | | | | 219/230 |
| 4,805,827 A * | 2/1989 | Coffman | ................ | B23K 1/012 |
| | | | | 228/20.1 |
| 5,042,708 A * | 8/1991 | Ledermann | .......... | B23K 3/0615 |
| | | | | 219/209 |
| 5,109,147 A * | 4/1992 | Erlach | .................... | B23K 3/025 |
| | | | | 219/233 |
| 5,483,040 A | 1/1996 | Fortune | ......................... | 219/230 |
| 5,579,979 A * | 12/1996 | Kurpiela | ................ | B23K 1/012 |
| | | | | 228/264 |
| 5,785,237 A * | 7/1998 | Lasto | .................... | B23K 1/012 |
| | | | | 228/180.22 |
| 5,804,795 A | 9/1998 | Fortune | ......................... | 219/229 |
| 5,810,241 A * | 9/1998 | Gabriel | ................ | B23K 1/012 |
| | | | | 228/49.5 |
| 6,186,387 B1 * | 2/2001 | Lawrence | ............. | B23K 1/018 |
| | | | | 219/227 |
| 6,550,669 B1 * | 4/2003 | Walz | .................... | B23K 1/018 |
| | | | | 228/19 |
| 7,559,202 B2 * | 7/2009 | Prociw | .................... | F23R 3/283 |
| | | | | 60/740 |
| 2012/0088362 A1 * | 4/2012 | Hwang | .................. | H01L 24/16 |
| | | | | 438/615 |

FOREIGN PATENT DOCUMENTS

| | | | | |
|---|---|---|---|---|
| JP | 63126668 A * | 5/1988 | ............... | B23K 3/06 |
| JP | 2003251460 A * | 9/2003 | ............ | B23K 3/022 |
| JP | 2003282605 A * | 10/2003 | ............ | H01L 24/75 |
| WO | WO-2006077618 A1 * | 7/2006 | ........... | B23K 1/0016 |
| WO | WO-2017129678 A2 * | 8/2017 | ............. | B23K 9/323 |

* cited by examiner

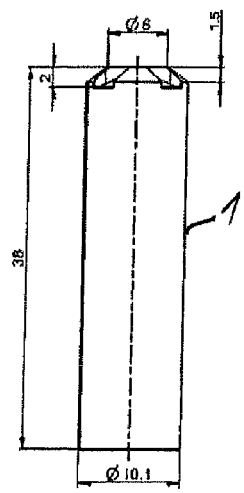
Fig. 1a
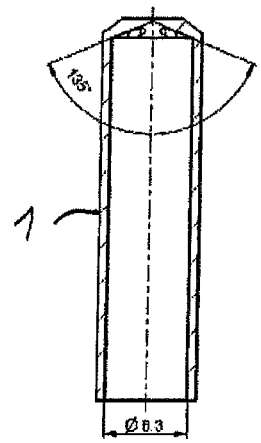
Fig. 1c  A-A
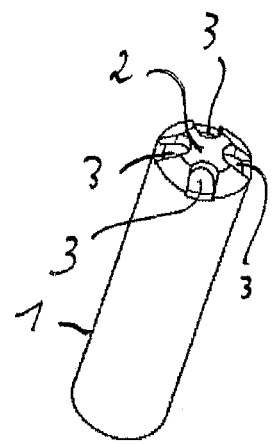
Fig. 1d
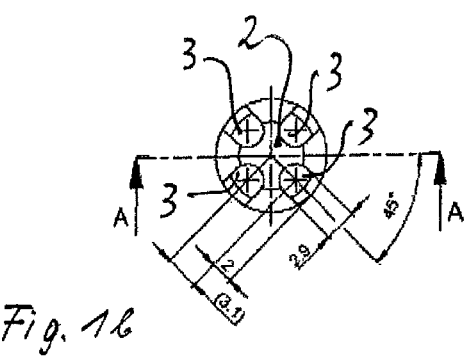
Fig. 1b

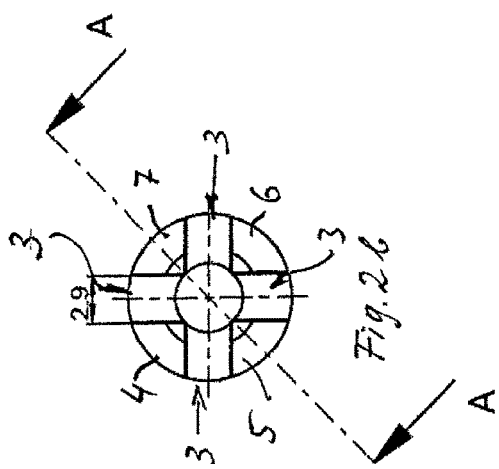
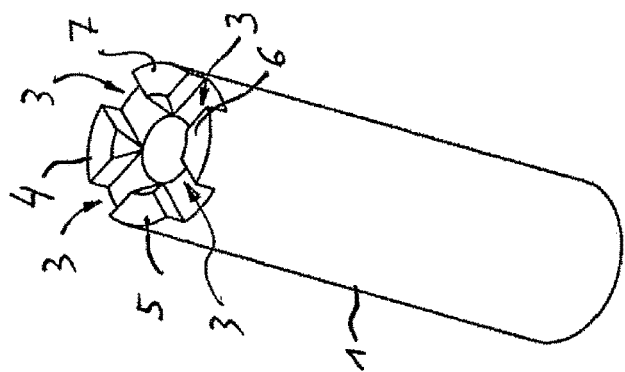
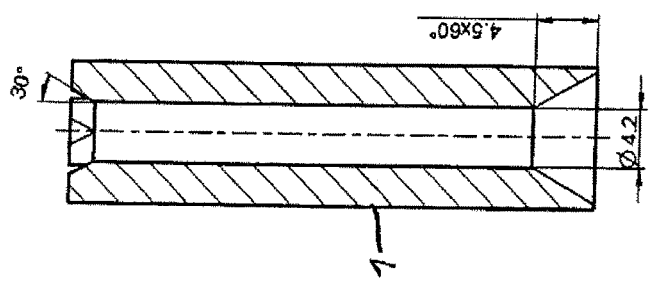
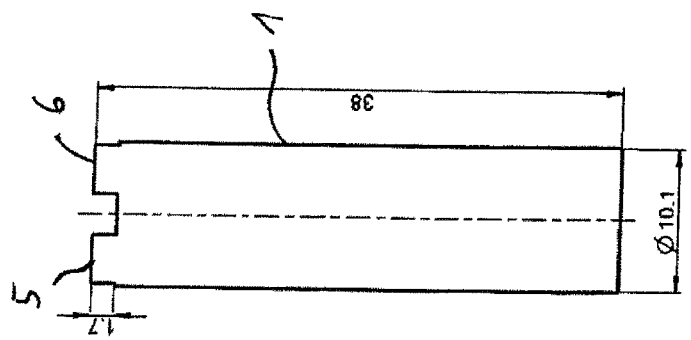

SOLDERING TOOL WITH NOZZLE-SHAPED SOLDERING TIP AND A CHANNEL IN THE SOLDERING TIP TO FEED HOT GAS

The invention relates to a soldering tool with a nozzle-shaped soldering tip and a hot gas feed channel that runs in the soldering tip, wherein the channel transitions into hot gas exhaust openings and wherein the soldering tip and a portion of the soldering environment is heatable according to the preamble of claim 1.

So-called "contact soldering methods" are known in the art. Thus, thermal energy is introduced by direct contact into the elements that are to be soldered, this means connected. The most well-known embodiment is a classic soldering iron. When soldering on glass or silver print only a small surface is heated. This can have the effect that cracks appear in the surrounding glass due to the heat introduction since the heated portions expand while being surrounded by colder non-expanded portions.

The advantage of contact soldering with a smaller process time of, e.g., five seconds, comes with the disadvantage of a possible crack formation in the glass. Technically implemented products in this case are, e.g., window panes of motor vehicles, which are provided with heating conductors or antenna imprints and which are to be contacted through soldering islands.

Hot air soldering is also known in the art, thus thermal energy is introduced into the object to be soldered by an airflow, thus contactless.

Hot air soldering causes longer process times in a range of 10-15 seconds.

It has become evident that objects to be soldered act as cooling bodies as a function of their thermal capacity and their spatial dimensions so that a certain amount of time goes by until the entire object to be soldered has reached a temperature that is sufficient to melt the solder.

During this time the space about the soldering location is heated by the hot air flow.

When the soldering spot is arranged on a glass substrate, it is appreciated that the glass has a much lower heat conductivity. This means that higher temperatures are reached very quickly in a small space.

Due to the fact that heat conductivity of a copper material is 300 times higher than the heat conductivity of glass and even the heat conductivity of stainless steel or FeNi has a heat conductivity that is 20 times higher than the heat conductivity of glass, this yields very pronounced temperature spikes close together with, this means directly adjacent to the soldering location.

Another problem of hot air soldering is that additional measures have to be taken in order to fix the soldering object, this means the component to be soldered on a carrier during soldering, for example, on a glass pane.

DE 24 40 005 A1 discloses a device for heating gaseous and/or liquid flow media. The device is configured to dispense a directed media flow, in particular an air flow. The known solution shows feeding a directed flow of heated air through an electric soldering tool.

In the electric soldering tool according to U.S. Pat. No. 5,483,040 A, a gas is heated electrically and run through a metal soldering tip which has a deep slot or ribs in order to provide maximum heat transfer. The slots can also be shaped so that the hot gas is exhausted forward through the tip in order to supply heat to the soldering object, this means to the workpiece.

The slots can also be configured so that the hot gas is exhaustable laterally or towards the rear in order to support removing contaminants from the environment of the soldering process.

U.S. Pat. No. 5,804,795 A discloses a soldering tip heat accumulator. Thus, the soldering tip is combined with the heat accumulator wherein the heat accumulator includes essentially a hollow cylinder which is arranged over a cylindrical heater as well as over a portion of the metal soldering tip.

In one embodiment the operating tip of a soldering device is provided with slots in order to facilitate a hot gas exit. Instead of hot gas also a protective gas can be run to the soldering portion.

Summarizing the prior art, known contact soldering and hot air soldering methods have advantages and disadvantages which stipulate that the one or the other method is only optimally suited for certain applications, since the environment of the soldering object is damaged otherwise or excessive process cycle times are generated which should be avoided under economical aspects.

Thus, it is an object of the invention to provide an improved soldering tool with a nozzle-shaped soldering tip and a hot gas feed channel that extends in the soldering tip, wherein the soldering tool combines the advantages of proven contact soldering with the advantages of hot air soldering but assures that temperature gradients between the soldering object and the substrate that form temperature spikes are avoided in order to prevent damages in particular at the substrate.

The object is achieved by a soldering tool with the feature combination according to claim 1, wherein the dependent claims define useful embodiments and improvements.

Thus a soldering tool with a nozzle-shaped soldering tip is used as a starting point.

A hot gas feed channel runs in the soldering tip, wherein the hot gas feed channel transitions into hot gas exhaust openings.

The hot gas heats the soldering tip as well as a portion of the soldering environment.

According to the invention the soldering tip includes one or plural contact surfaces which include a surface structure which corresponds to a surface structure of a soldering object.

These are in particular flat contact surfaces.

With an embodiment of this type the soldering object is thermally contactable by the soldering tip with a low thermal resistance and is mechanically fixated.

Through placement of the soldering tip and mechanically contacting the soldering object, the hot gas jet that passes through the openings goes through at least one directional reversal or directional change.

The hot gas jet therefore does not reach the substrate directly and unimpeded, wherein the soldering object is attached on the substrate. The flow deflection, rather, has the consequence that the substrate is evenly heated in view of the different heat transfer coefficients between the soldering object and the substrate. This avoids thermally induced tensions.

Due to the fact that the contact surfaces of the soldering tip contact the surface of the soldering object directly, a quick transmission of thermal energy to the soldering object is provided additionally which shortens the process times.

Thus, a primary energy transmission is provided through the contact of the soldering tools, this means of the nozzle-shaped soldering tip with the soldering object is provided. The environment is heated by the hot gas, in particular hot air, indirectly and more slowly. As a consequence, a certain compensation of the different thermal conductivities occurs so that a heat distribution in the substrate, in particular, in the glass, is more uniform.

In a first embodiment of the invention, the soldering tip is configured as a hollow cylindrical nozzle, wherein at least one of the contact surfaces is formed at a nozzle end in a center of the object hollow cylinder that is oriented towards the soldering object and contact wherein the contact surface is enveloped by plural openings that facilitate an exhaust of the hot gas jet.

The openings are recessed back from the plane of the contact surface in one embodiment.

The at least one contact surface extends orthogonal to a longitudinal axis of the hollow cylinder.

The heat capacity of the soldering tip can be predetermined or adjusted through the wall thickness of the hollow cylinder.

A greater wall thickness leads to a greater heat capacity and thus to an implementation of a larger heat accumulator. Thus, also larger soldering objects can be successfully bonded quickly and reliably within a shorter process time.

In a second embodiment of the invention, the soldering tip is configured as a hollow cylindrical nozzle, wherein plural contact surfaces are implemented as axial protrusions of the cylinder wall.

Free spaces are provided between the protrusions, wherein the free spaces form openings configured to exhaust the hot gas that flows through the interior of the cylinder.

Thus, the protrusions can be implemented in a pinnacle pattern.

Through the position and embodiment of the openings, the hot gas jet direction is predeterminable so that flow-shaded portions can be provided at or proximal to the soldering object in order to protect thermally sensitive components.

The invention will be subsequently described in more detail based on embodiments with reference to drawing figures.

FIG. 1a illustrates a side view of a first embodiment of the nozzle-shaped soldering tip according to the invention;

FIG. 1b illustrates a top view of a contact surface side of the soldering tip according to the first embodiment;

FIG. 1c illustrates a longitudinal sectional view of the soldering tip according to the first embodiment along a sectional line A-A;

FIG. 1d illustrates a perspective view of the nozzle-shaped soldering tip according to the first embodiment;

FIG. 2a illustrates a side view of the second embodiment of the nozzle-shaped soldering tip with pinnacle shaped protrusions;

FIG. 2b illustrates a top view of the pinnacle-shaped contact surfaces;

FIG. 2c illustrates a longitudinal sectional view of the second embodiment of the nozzle-shaped soldering tip according to the line A-A according to FIG. 2b;

FIG. 2d illustrates a perspective view of the second embodiment of the nozzle-shaped soldering tip;

Figure 3:
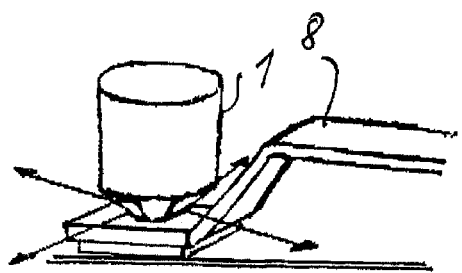
FIG. 3 illustrates a sketch of the practical application of the nozzle-shaped soldering tip according to the first embodiment with a deflected hot gas jet that is symbolized by an arrow.

The soldering tools with the nozzle-shaped soldering tips according to the embodiments are based on a hollow cylinder 1 that can have different wall thicknesses according to FIGS. 1c and 2c, which facilitates controlling a heat capacity of the corresponding soldering tip.

The soldering tip according to FIGS. 1a through 1d includes a central contact surface 2.

The central contact surface 2 is surrounded by plural openings 3 that provide an exhaust for the hot gas jet.

The openings 3 are oriented downward and recessed from the contact surface plane 2 with reference to the illustration in the drawing figures.

According to the embodiment of FIGS. 2a through 2d, the basic structure of the soldering tip is a hollow cylinder 1, however, provided with a greater wall thickness compared to the embodiment according to FIG. 1c.

Figure 4:
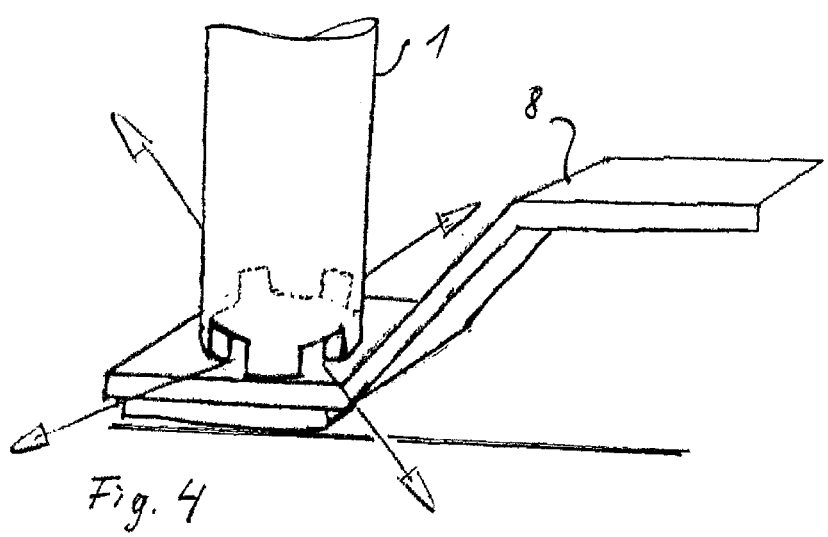
FIG. 4 illustrates a representations similar to FIG. 3, however, using the nozzle-shaped soldering tip according to second embodiment.

Plural contact surfaces 4; 5; 6; 7 extend as axial protrusion of the cylinder wall and form contact surfaces to provide a heat transfer to a soldering object, e.g., a soldering base 8, as illustrated in FIG. 4.

Between the protrusions 4; 5; 6; 7 free spaces remain with a function that is analogous to the openings 3 as illustrated with respect to the first embodiment.

The protrusions 4; 5; 6; 7 are configured pinnacle shaped or as circle segments. In view of the diameter of the hollow cylinder correspondingly large contact surfaces with the solder object 8 can be implemented.

From the illustrations according to FIGS. 3 and 4 it is evident that the hot gas jet direction is predeterminable by the position and configuration of the openings 3.

Thus also a shadowing of the hot gas jet occurs so that thermally sensitive components which are arranged at or proximal to the soldering object are protected.

FIGS. 3 and 4 now illustrate how the soldering process is performed quasi in the last step. The nozzle shaped soldering tip according to FIGS. 1a-1d, is applied as evident from FIG. 3 onto a soldering base 8 as a typical soldering object and contacts a surface of the soldering base 8. Through this contact thermal energy is applied to the soldering object together with the flux layer onto the carrier substrate.

The environment of the soldering object which typically has low heat conductivity is slowly heated by the deflected hot gas jet so that no damaging temperature spikes can be generated adjacent to the soldering spot.

According to the illustration according to FIG. 4 a soldering tip according to the second embodiment according to FIGS. 2a-2d is used. Nozzle shaped soldering tips of this type can be used in particular when soldering copper foils. The larger contact surface with the soldering object yields a better and quicker transfer of the required thermal energy.

The useable greater wall thickness of the hollow cylindrical solder tip yields a higher heat capacity and an improved process.

The hot gas jet is guided with the same advantages as already described with reference to FIG. 3.

Based on the tests performed it was proven that the combination soldering tip facilitates in particular to solder copper foils on composite safety glass reliably. Process times were reduced and cracks in the glass were avoided.

The primary energy transfer is performed by the mechanical contact between the respective contact surface of the soldering tip and the controlled heating of the

The invention claimed is:

1. A soldering tool, comprising:
   a nozzle shaped soldering tip and a hot gas feed channel that runs in the soldering tip, wherein the hot gas feed channel includes openings (3) that provide a hot gas exhaust, and wherein the soldering tip as well as a portion of a soldering environment is heatable by the hot gas, and a primary energy transmission is exclusively provided through direct contact of the soldering tool with the surface of the soldering object, characterized in that the soldering tip includes one or plural contact surfaces (2; 4; 5; 6; 7) that have a surface structure which corresponds to a surface structure of a soldering object so that the soldering object is thermally contactable by the soldering tip with a minimum heat resistance, wherein a hot gas jet that passes through the openings (3) is forced to perform at least one directional reversal or directional deflection by placement of the soldering tip and contacting the soldering object, and the openings (3) are recessed backward and downward from the contact surface plane, wherein the contact surfaces of the soldering tip contact the surface of the soldering object directly, wherein through this contact thermal energy is applied to the soldering object with a flux layer between the soldering object and a carrier substrate.

2. The soldering tool according to claim 1, characterized in that the soldering tip is configured as a hollow cylindrical nozzle (1), wherein at least one of the contact surfaces (2) is configured at a nozzle end in a center of the hollow cylinder wherein the nozzle end is oriented towards the soldering object, wherein the contact surface (2) is surrounded by plural openings (3) that facilitate an exit of the hot gas jet.

3. The soldering tool according to claim 1, characterized in that the at least one contact surface (2) extends orthogonal to a longitudinal axis of the hollow cylinder.

4. The soldering tool according to claim 2, characterized in that a heat capacity of the soldering tip is predeterminable by a wall thickness of the hollow cylinder (1).

5. The soldering tool according to claim 1, characterized in that the soldering tip is configured as a hollow cylindrical nozzle, wherein plural contact surfaces (4; 5; 6; 7) are implemented as axial protrusions of the cylinder wall.

6. The soldering tool according to claim 5, characterized in that free spaces are provided between the protrusions (4; 5; 6; 7) wherein the free spaces form openings that facilitate the exit of the hot gas that flows through an interior of the cylinder.

7. The soldering tool according to claim 5, characterized in that the protrusions (4; 5; 6; 7) are configured pinnacle shaped.

8. The soldering tool according to claim 1, characterized in that a hot gas jet direction is predeterminable by the position and configuration of the openings so that shadowed portions are created in a controlled manner to protect thermally sensitive components at or proximal to the soldering object.

9. The soldering tool according to claim 1, characterized in that the soldering tool is used for combined hot gas and contact soldering, wherein the contact surface of the nozzle is predetermined by the nozzle geometry and on the other hand side an environment of the soldering object is heated so that the environment is heatable indirectly and more slowly by the hot air, whereas the soldering object is quickly brought to the respective soldering temperature by the thermal contact.

* * * * *